US012688587B2

(12) United States Patent
Javan Roshtkhari et al.

(10) Patent No.: US 12,688,587 B2
(45) Date of Patent: Jul. 21, 2026

(54) SYSTEMS AND METHODS FOR DETECTION, PREDICTION, AND VALUE ESTIMATION OF ACTIVITIES AND EVENTS

(71) Applicant: Sportlogiq Inc., Montreal (CA)

(72) Inventors: Mehrsan Javan Roshtkhari, Beaconsfield (CA); Bahareh Pourbabaee, Beaconsfield (CA); Oliver Norbert Schulte, Burnaby (CA)

(73) Assignee: Sportlogiq Inc., Montreal (CA)

( * ) Notice: Subject to any disclaimer, the term of this patent is extended or adjusted under 35 U.S.C. 154(b) by 282 days.

(21) Appl. No.: 18/529,204

(22) Filed: Dec. 5, 2023

(65) Prior Publication Data

US 2024/0119606 A1 Apr. 11, 2024

Related U.S. Application Data

(63) Continuation of application No. PCT/CA2021/050973, filed on Jul. 14, 2021.

(51) Int. Cl.
*G06T 7/215* (2017.01)
*G06Q 10/0639* (2023.01)

(52) U.S. Cl.
CPC ....... *G06T 7/215* (2017.01); *G06Q 10/06398* (2013.01); *G06T 2207/10016* (2013.01); *G06T 2207/30224* (2013.01)

(58) Field of Classification Search
CPC ........... G06T 7/215; G06T 2207/10016; G06T 2207/30224; G06Q 10/06398;
(Continued)

(56) References Cited

U.S. PATENT DOCUMENTS 8,923,607 B1 12/2014 Kwartra et al.
10,402,655 B2 9/2019 Javan Roshtkhari et al.
(Continued)

FOREIGN PATENT DOCUMENTS

CA 3120594 A1 * 8/2020 ............. H04H 60/64
WO 2004/014061 A2 2/2004
WO 2017/201608 A2 11/2017

OTHER PUBLICATIONS

Extended European Search Report issued in related EP Application No. 21949545.4; Feb. 6, 2025.
(Continued)

*Primary Examiner* — Charlotte M Baker
(74) *Attorney, Agent, or Firm* — CPST Intellectual Property Inc.; Brett J. Slaney

(57) ABSTRACT

Systems and methods are described to analyze visual data and trajectory data from sports and games, to determine the content of the input data and detect actions and events, quantitatively measure their impact on the future activities and events and make predictions. In real-time, at every moment of the game, the probability of the next action/event in the game is estimated; the impact of the current state of the game on the future outcomes are predicted; and the current player action/match event is labelled. More specifically, given a predefined objective, a quantitative value is assigned to the input data based on the current observation characterizing the probability of reaching an objective, or incremental changes to that probability based on the observed state of the game from the video or trajectory data.

20 Claims, 8 Drawing Sheets

(58) Field of Classification Search

CPC ...... G06Q 50/34; G06N 3/006; G06N 3/0455; G06N 3/092; G06N 3/042; G06N 3/0442; G06N 3/0464; G06N 7/01; G07F 17/3288; G06V 10/764; G06V 10/82; G06V 20/40; H04N 21/23418; H04N 21/8133

USPC ........................................................ 382/103

See application file for complete search history.

(56) References Cited

U.S. PATENT DOCUMENTS

| 2020/0387817 A1* | 12/2020 | Kurtz | G06F 18/251 |
| 2024/0198202 A1* | 6/2024 | Ono | A63B 71/06 |

OTHER PUBLICATIONS

Kurt Routley et al: "A Markov Game model for valuing actions, locations, and team performance in ice hockey", Journal of Data Mining and Knowledge Discovery, Dec. 1, 2015 (Dec. 1, 2015), XP055441142, US ISSN: 1384-5810.

Joachim Gudmundsson et al: "Spatio-Temporal Analysis of Team Sports", ACM Computing Surveys (CSUR), Association for Computing Machinery, vol. 50, No. 2, Apr. 11, 2017 (Apr. 11, 2017), pp. 1-34, XP058327414, DOI: 10.1145/3054132.

International Search Report issued in related PCT Application No. PCT/CA2021/050973; Search completed Jul. 29, 2021.

Cervone, D. et al. "POINTWISE: Predicting Points and Valuing Decisions in Real Time with NBA Optical Tracking Data," Feb. 28-Mar. 1, 2014.

Liu, Guiliang and Schulte, Oliver; "Deep Reinforcement Learning in Ice Hockey for Context-Aware Player Evaluation." Proceedings of the Twenty-Seventh International Joint Conference on Artificial Intelligence, International Joint Conference on Artificial Intelligence Organization, Jul. 13-19, 2018; Crossref, doi:10.24963/ijcai.2018/478.

Gavrilyuk, Kirill, Sanford, Ryan; Javan, Mehrsan and Snoek, Cees GM. "Actor-transformers for group activity recognition." In Proceedings of the IEEE/CVF Conference on Computer Vision and Pattern Recognition; Jun. 14-19, 2020 (pp. 836-845). (CVPR). IEEE Computer Society. https://doi.org/10.1109/CVPR42600.2020.00092.

Karpathy, Andrej; Toderici, George; Shetty, Sanketh; Leung, Thomas; Sukthankar, Rahul, and Fei-Fei, Li. "Large-scale video classification with convolutional neural networks." 2014 IEEE Conference on Computer Vision and Pattern Recognition, Columbus, OH, USA, 2014, pp. 1725-1732, doi: 10.1109/CVPR.2014.223; https://static.googleusercontent.com/media/research.google.com/en//pubs/archive/42455.pdf.

Liu, Guiliang; Schulte, Oliver; Poupart, Pascal; Rudd, Mike; and Javan, Mehrsan; "Learning Agent Representations for Ice Hockey." Proceedings of the 34th International Conference on Neural Information Processing Systems; Dec. 2020; Article No. 1570; pp. 18704-18715; https://dl.acm.org/doi/10.5555/3495724.3497294.

Zhenyang, Li, Gavrilyuk, Kirill, Gavves, Efstratios, Jain, Mihir, and Snoek, Cees GM. "Videolstm convolves, attends and flows for action recognition." Computer Vision and Image Understanding 166 (2018): 41-50; https://www.sciencedirect.com/science/article/abs/pii/S1077314217301741.

Carreira, Joao, and Zisserman, Andrew;. "Quo vadis, action recognition? a new model and the kinetics dataset." In proceedings of the IEEE Conference on Computer Vision and Pattern Recognition, pp. 6299-6308. May 22, 2017; https://arxiv.org/abs/1705.07750.

\* cited by examiner

SYSTEMS AND METHODS FOR DETECTION, PREDICTION, AND VALUE ESTIMATION OF ACTIVITIES AND EVENTS

CROSS-REFERENCE TO RELATED APPLICATION(S)

This application is a Continuation of PCT Application No. PCT/CA2021/050973 filed on Jul. 14, 2021, the contents of which are incorporated herein by reference in their entirety.

TECHNICAL FIELD

The following generally relates to systems and methods for video and image processing for recognizing and predicting activities and events, in particular for sport analytics applications.

BACKGROUND

Analysis of visual data such as images and videos involves modelling the video content to support the following tasks for each time unit, e.g. a video frame, i) Detection: detect and identify events and actions such as activities, group activities and interactions of human and objects; ii) Event prediction: assign a quantitative value to each event of interest describing the likelihood of the event of interest happening in the future; iii) Sequence prediction: predict the next sequences of events prior to observing them, and iv) Trajectory prediction: predict the locations of the humans and objects for the future timestamps.

As an example, in a sports game such as ice hockey, one might be interested in estimating the probability of the next goal, i.e., an event of interest, given the visual observations of the game up to the current moment.

The available data sources for building systems that achieve the sports analytics tasks mentioned above can be categorized into three main groups: i) a discrete sequence of player actions, typically known as play sequence data, play-by-play data, or event data; ii) player trajectory data, also known as tracking data, that specify the spatial location of each player at a given time during the match; and iii) visual data such as video feeds.

In prior attempts, video analysis methods have been developed to solve detection problems only, namely, describe the visual content to detect and identify the observed events (see Refs [1, 2, 3]). A detection system usually assigns a label to each video frame or a plurality of the frames that indicates the action or event taking place in the frame or the plurality of the frames, (e.g., a "shot" in a hockey game and the corresponding video frame). Various techniques are proposed to detect activities and events from visual data. However, detection systems do not perform any type of prediction.

In prior attempts event prediction methods, for example to determine the expected value of a player's action, are based on event data, trajectory data, or a combination of the two [4, 5]. These techniques do not provide predictions based on video data alone or trajectory data alone.

Moreover, in prior attempts, the visual data such as video feeds are used to detect and classify actions and interactions to describe the content of the visual data, without any consideration of the predictive aspects of the visual data and predicting the next likely action and interaction. Most of the event detection related prior art is based on extracting features from visual data that are useful in assigning event/action labels. These features are either engineered or learnt and capture the spatial and temporal relationship between people and objects in the scene. Techniques for learning to extract features with artificial neural networks of the image/video State-of-the-art techniques for image recognition such as Convolutional Neural Networks (CNNs) have been used for action detection and extended from two dimensional images to capture temporal information and account for time in the videos which is vital information for action recognition. Earlier methods rely on extracting features from each video frame using two dimensional (2D) CNNs and then fusing them using different fusion methods to include temporal information (see Ref [3]). Some prior art methods have leveraged Long Short-Term Memory neural networks (LSTMs) to model long-term temporal dependencies across frames (see Ref [6]). Some work has extended the two dimensional (2D) convolutional filters to three dimensional (3D) filters by using time as the third dimension to extract features from videos for different video analysis tasks (see Ref [7]).

In the context of sports and games, state-of-the-art sport analytics methods rely on receiving players location data from a tracking system and players' action in a game, often referred to as the play sequence, as the inputs of a processing system, and analyze them to either assign a quantitative value to each action or estimate the impact of each action on a given objective (see Refs [4, 5]). For example, Schulte et al. takes a sequence of the individual players actions and events, interactions, team related events and the game context as the inputs of a Markov decision process to estimate the expected value of each action in the sequence, given a pre-defined objective (see Ref [4]).

Similarly, Liu et al. uses the player actions and game events, such as passes and shots, in a form of play sequence data to model each player in ice-hockey based on a Markov game model; and estimate the expected goals and predict the final score difference (see Ref [5]).

SUMMARY

The following discloses a method for comprehensive analysis of the visual data while extracting both predictive and descriptive information directly from visual data.

In contrast to prior art sport analytics and visual data processing attempts, the following discloses a method for building systems that simultaneously achieve the main sports analytics tasks of detection and prediction based on visual data or trajectory data, and extracts event data and trajectory data automatically from visual data. The disclosed methods can simultaneously address detection and prediction in a single framework that optimizes both.

In one aspect, there is provided a method for processing data to describe content of the data and to generate predictions associated with events occurring in the content, the method comprising: receiving input data comprising at least one of: i) at least one image from a video of a scene showing one or more entities at a corresponding time, or ii) at least one location data or a plurality of location data related to the one or more entities in a scene; applying at least one descriptive and predictive model on the received data by way of a mapping function transforming the received input data into output data, the at least one descriptive and predictive model comprising the mapping function previously learnt from historical data; and providing output data comprising an estimation of a likelihood of at least one event of interest occurring in the video or the scene.

In other aspects, there are provided computer readable media and devices configured to perform the method.

BRIEF DESCRIPTION OF THE DRAWINGS

Embodiments will now be described with reference to the appended drawings wherein.

DETAILED DESCRIPTION

Figure 1:
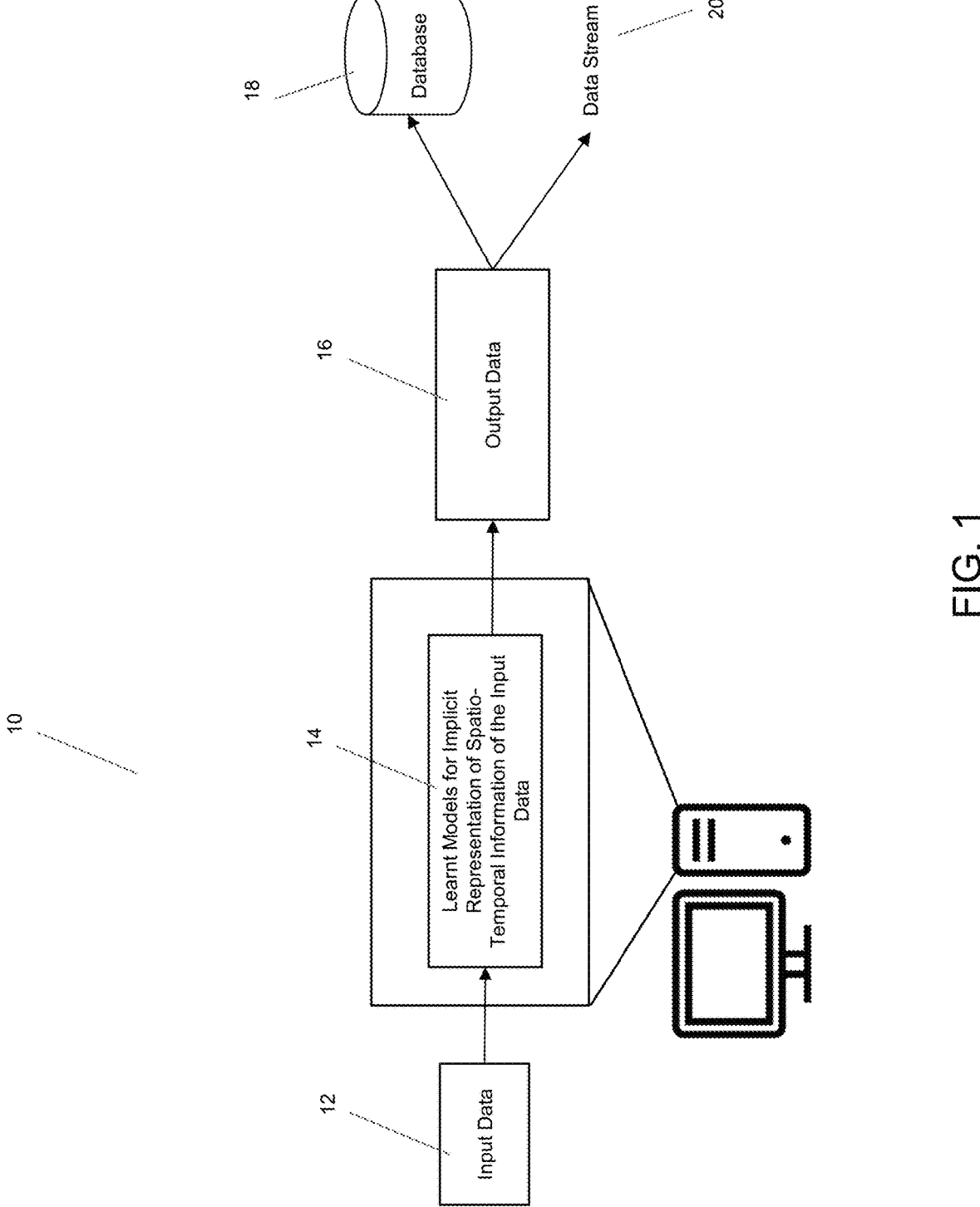
FIG. 1 depicts a schematic block diagram of a module or device for video data analysis using learnt models.

In contrast to prior attempts, in one example embodiment described herein, a method is disclosed in which impact values are derived directly from the video frames without generating trajectory data or using play sequence data. The method allows for generating data in real-time for player/team performance evaluation, media applications and sports betting.

To overcome the limitations of prior attempts, the following discloses a method for generating one or a combination of the following output data points from a sport game, in particular using visual data or trajectory and location data without explicitly using play sequence data as the inputs:

1) the current activity/actions happening and their attributes given the current observation,
2) expected value of each observation at a given time with respect to a predefined objective,
3) the next likely events/actions in the game,
4) the next likely actions and attributes, their probability of occurrence and their respective time,
5) or a probability distribution function characterizing the occurrence of the future events and their attributes,
6) the expected value of the future action,
7) the probability of reaching a predefined objective,
8) the predicted location of the players and objects in the future timestamps.

The expected values can be learnt using a stochastic model-driven metric that evaluates and assigns a numeric value to every observation in the input data, using a predefined objective, thereby generating a continuous output that maps every input datum at a given time to at least one of the previously mentioned outputs.

Conventional approaches take the play sequence data and estimate the impact values of the temporally sparse events, but no conventional system explicitly generates the impact values for temporally dense observations, directly from the visual data or trajectory data without using labelled events. Conventional approaches also do not make predictions about the likely events and their attributes in future, given the visual or trajectory data as the inputs.

Further, conventional impact value estimation models in sports and games neither make any prediction about the likelihood of reaching the objective, nor estimate a probability distribution for a predefined objective as a function of time.

One or more techniques disclosed herein generally relate to systems and methods for describing and predicting the outcome of a sport or a game, the current actions happening at the moments when the observations take place, the next likely action and event, the probability of an objective to happen, and the locations of the players and their actions.

A system and method are described for automatically analyzing and understanding the content of visual data, and at a given time assign a quantitative value to visual data and each event describing the likelihood of an event of interest happening in the future and predicting the next sequences of events prior to observing them. The quantitative values measure the impact of the current content of the videos on the future activities and events and predict the future activities and events.

In the context of sports and games, the method receives a video stream of a sporting event, such as a soccer match or a hockey game. In real-time, at every moment of the game, the probability of the next action/event in the game is estimated; the impact of the current state of the game on the future outcomes are predicted; and the current player action/match event is labelled.

More specifically, given a predefined objective and a video stream as the inputs, a quantitative value is assigned to each video frame that represents the probability of reaching the objective, or incremental changes to that probability based on observing the current state of the game from the video data. For example, the objective can be scoring the next goal for a specific team in a soccer match. In such an example, at every moment during the match, the input video stream can be processed and the probability of scoring the goal for that team adjusted based on the pixel contents of the video. In addition, the probability of the next player actions/game events are estimated and its impact on scoring the next goal.

In contrast to previous techniques in which it is required to use play sequence data comprising of either automatically or manually detected and labelled actions and activities, the presently described learning based method uses machine learning and general function approximation techniques such as artificial neural networks to assign a quantitative value to every moment in time, given the visual information that it receives.

In one embodiment, the impact values are derived directly from the video frames without using trajectory data or play sequence data. In another embodiment, the same "impact values" are derived solely from the trajectory data without using visual data or play sequence data. In addition to assigning the impact values to each moment during a game, the method provides information about the current event/action, the next likely action/event, and the time to reach the desired objective.

In another embodiment, the method takes the location data of the players and the ball, and without using labelled actions and activities as an input, the presently described learning based method uses machine learning and general function approximation techniques such as artificial neural networks to assign a quantitative value to every moment in time, given the aforementioned location data that it receives.

The method can follow a function approximation procedure, wherein a general function approximator such as a deep artificial neural network is employed. The function approximator can take either the player trajectory location data and/or the video data as the input and assigns a numerical value to the input data at every timestamp.

Definitions

Actions or activities or events: Actions, events, activities, group activities, and interactions which are used interchangeably herein refer to human actions, human-human interactions, human-object interactions, or object-object interactions. In the context of sport events, humans correspond to sport players and sport officials, objects correspond to balls or pucks used in the sport, and the activities and interactions are players' actions during the sport event. Some examples are scoring a goal, taking a shot, making a pass, gaining possession of the ball/puck, etc. Actions and activities are characterized by their labels, and often are accompanied with their attributes including but not limited to their outcome, the player or the team that is taking the action, location of that action in space, and the time that an action happens. Actions and activity labels are defined as a set of selected features that are intuitively relevant for the game dynamics.

Objective: a predefined action or event of interest, or a combination of different actions that is expected from the method to learn and predict their occurrence. An example of the objective in a sport such as ice-hockey can be scoring a goal. That objective is used to i) assign a quantitative value at every moment in time to the input data, and ii) generate a probability distribution function from the input data indicating the likelihood of reaching the objective.

Impact value: Given an objective, at every moment in time, t, a quantitative value can be assigned to the input data indicating: i) how the current observations from input data contribute towards reaching the objective which can be a positive or a negative quantity, and ii) how far in the future the objective will be achieved, with a quantitative value associated to the probability of achieving the objective.

Action value: Given an action happening at a moment, t, the impact values can be assigned to the actions to measure the same.

Play sequence data: often in sport or game, a sequence of actions with or without their attributes constitute the play sequence data, which is sometimes referred to as play-by-play information. Play sequence data is a plurality of events across a predefined time window, usually a match or a game. Play sequence data is a sparse set of observations, compared to the video or trajectory data in which there are sampled data points at any given timestamp.

Trajectory data: location data as a function of time, in a predefined coordinate system which is typically the 3D cartesian space. In a sport or game it can be players' location, ball or puck locations, and location of other individuals and objects.

An exemplary embodiment of the presently described systems and methods takes a visual input such as an image or video of a scene with multiple entities including individuals and objects and a predefined objective, to analyze and understand the actions and activities, measure their impact on achieving an objective by applying a numerical mapping function directly to the input data and map them into the desired outputs. The numerical mapping function is learnt from previously observed data points using machine learning techniques. For example, the previously observed data can include historical data or training data such that the mapping function can apply supervised-learning, self-supervised learning, online-learning, reinforced learning, variants thereof, or other AI algorithms.

In the exemplary embodiment, a set of labeled data is provided, referred to as the training data set in which there is at least one quantitative value assigned to a defined objective. Given the training set, machine learning algorithms learn to process the visual data for mapping the inputs into the output data by generating a numerical representation of spatial, temporal or spatio-temporal content of the visual data. After the training, the learnt models process an input image or video to generate the numerical representation of the visual content.

The one or more techniques described herein are significantly different from current sport analytics techniques. For example, one or more techniques described herein explicitly learns a mapping function from the input data to the desired output space, without the use of intermediate data points such as actions. In prior art attempts, all the expected value models and predictive models use the play sequence data or a sparse set of actions and events, to assign a quantitative value to them. The use of the labelled and identified actions and events in the prior art pose some major limitations, for example: i) the accuracy of the generated output is bounded by the accuracy of the event detection systems or the quality of the underlying labelled event data and play sequence data that is provided as the input to the system, and ii) the temporally sparse nature of the play sequence data makes it impossible to generate a continuous impact value, evolving continuously over time between the consecutive events, in real-time to make a temporally high resolution prediction about an objective of interest.

The techniques described herein remove the necessity of the use of play sequence data as the inputs to the predictive and descriptive models, and directly estimates and predicts the predefined objectives from a temporally dense observation stream, such as a video data or a stream of trajectory data. Such techniques stand in stark contrast to other impact value assignment models, where they take a sparse set of action data or play sequence data to estimate impact values of the actions.

Turning now to the figures, FIG. 1 depicts a schematic block diagram of a module, device or other computing system or component of a computer or computing system, for visual content analysis 10 from a visual input data 12 that can be a single image, or a sequence of images, showing a scene where humans and objects can be present such as a sport or a game. One or more learnt models of the pixel data 14 are applied to the visual input data 12 to extract the desired output data 16 including, but not limited to, a probability of reaching a predefined objective, expected time to reach the objective, and incremental changes to the probability of reaching the objective given the current observations. The output can also include generating labels for the current observations from visual data 12 such as the current actions and their attributes, the next actions/events and their corresponding attributes along with their probabilities of occurrence in the future timestamps.

Figure 2:
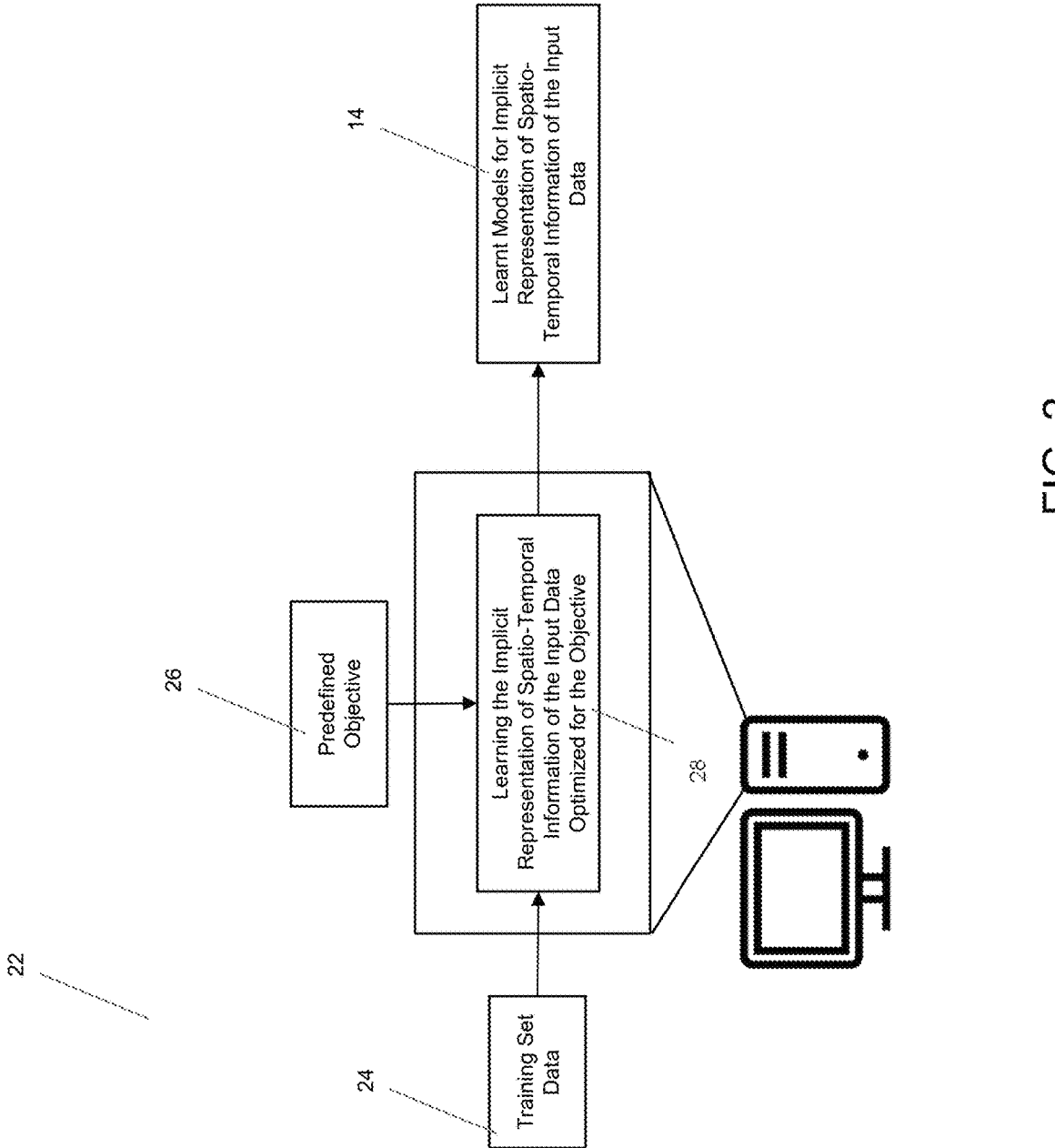
FIG. 2 depicts a schematic block diagram of a component of the video analysis process of FIG. 1 and the process to generate the learnt models.

FIG. 2 depicts a schematic block diagram of the training process 22 for general function approximators using machine learning techniques. Using either supervised learning or reinforcement learning techniques, the training set data 24 contains a plurality of the labelled or partially labeled data according to a predefined objective 26, and the learning process 28 can be stochastic, a gradient based optimization, a value iteration, or any standard machine learning technique. The learnt models are either one mapping function 14 that is applied on the input data to generate all the desired outputs or is a plurality of several distinct models in which each model learns to perform one specific task and generate one of the desired outputs.

As an example, for a hockey game and learning a mapping function to process video and generate the desired outcome, the mapping function and learnt models 14 can be 3D convolutional filters applied to the input pixel data in both spatial and temporal dimensions. The predefined objective 26 can be a goal scored for a team, the training data 24 contains the videos of the hockey games, with labels for the goals and the impact value of the goals.

The objective 26 can be an event of interest in a sport or game that may be set by a user, such as scoring a goal for a team or reducing the chance of getting a penalty for a team. As an example, if the objective is to attend to goals in a sport game, then the impact value of every single moment in the game on scoring the next goal for a team can be calculated. Some moments events may have a positive impact, negative impact or a neutral impact on scoring a goal.

Figure 3A:
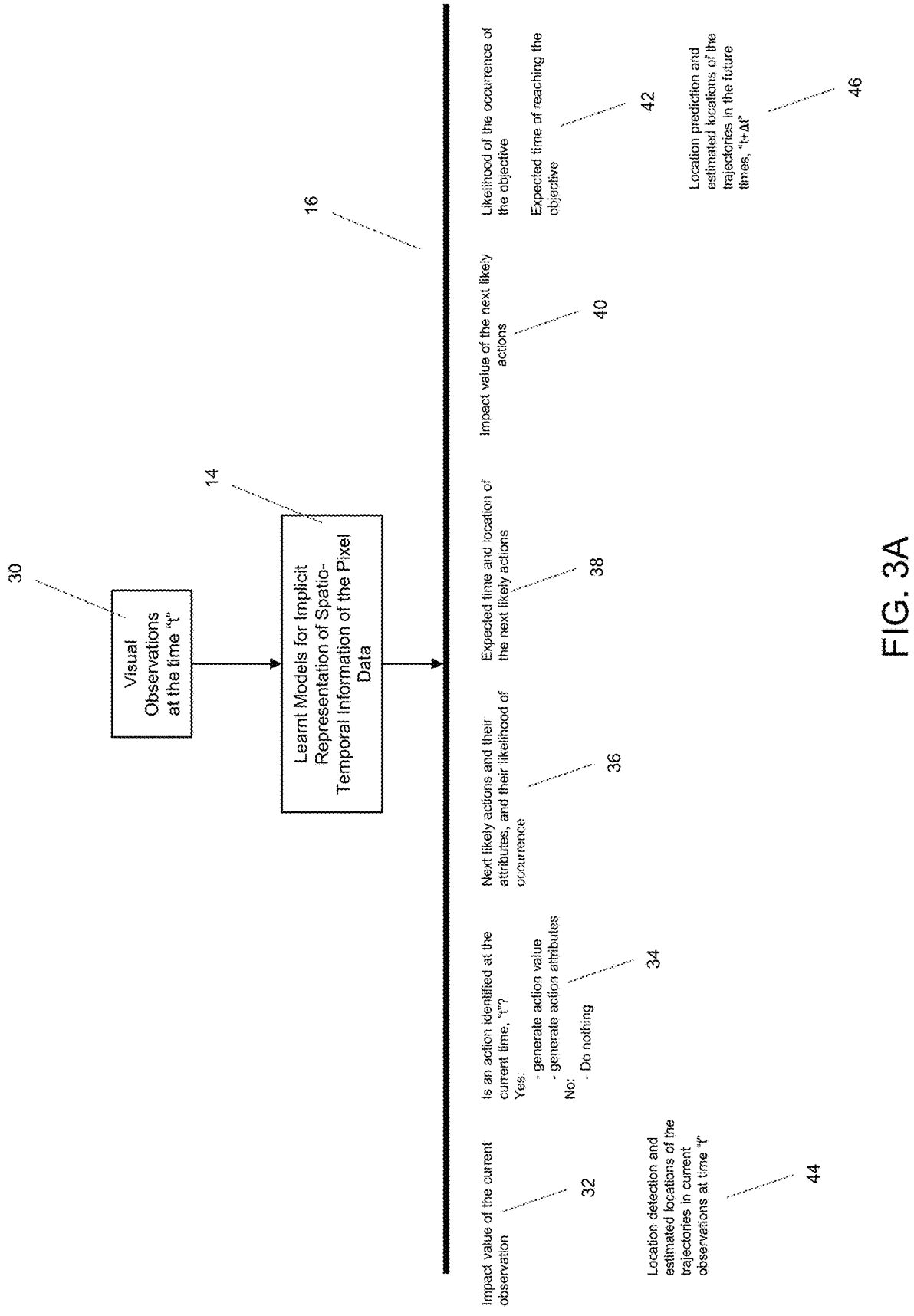
FIG. 3A depicts a block diagram illustrating the data analysis process from a video for generating some specific output data points, according to example embodiments.

FIG. 3A Illustrates a schematic block diagram of the data analysis process from a video for generating some specific output data points 16. The visual observations at the current moment, t, 30 are provided as the input data. The visual information can be one single image, captured at t, or a set of observations captured in a time window with the length of $\Delta t_0$, captured from $t-\Delta t_0$ to t. The learnt models 14 are mapping functions applied to the visual observations, and generate at least one of the following outputs: the impact value of the current observation 32, the activities currently happening in the observed input with their attributes 34, the probability of the next auctions and tier attributes 36 or a probability distribution function characterizing all the future possible actions and their attributes, the time interval for the future actions to happen 38 and their impact values 40, and a probability distribution function estimating at least one of the following components, the probability of the objective to happen given the current observations, and the expected time that will take from the observation time, t, to the moment that the objectives are reached in the future 42.

Figure 3B:
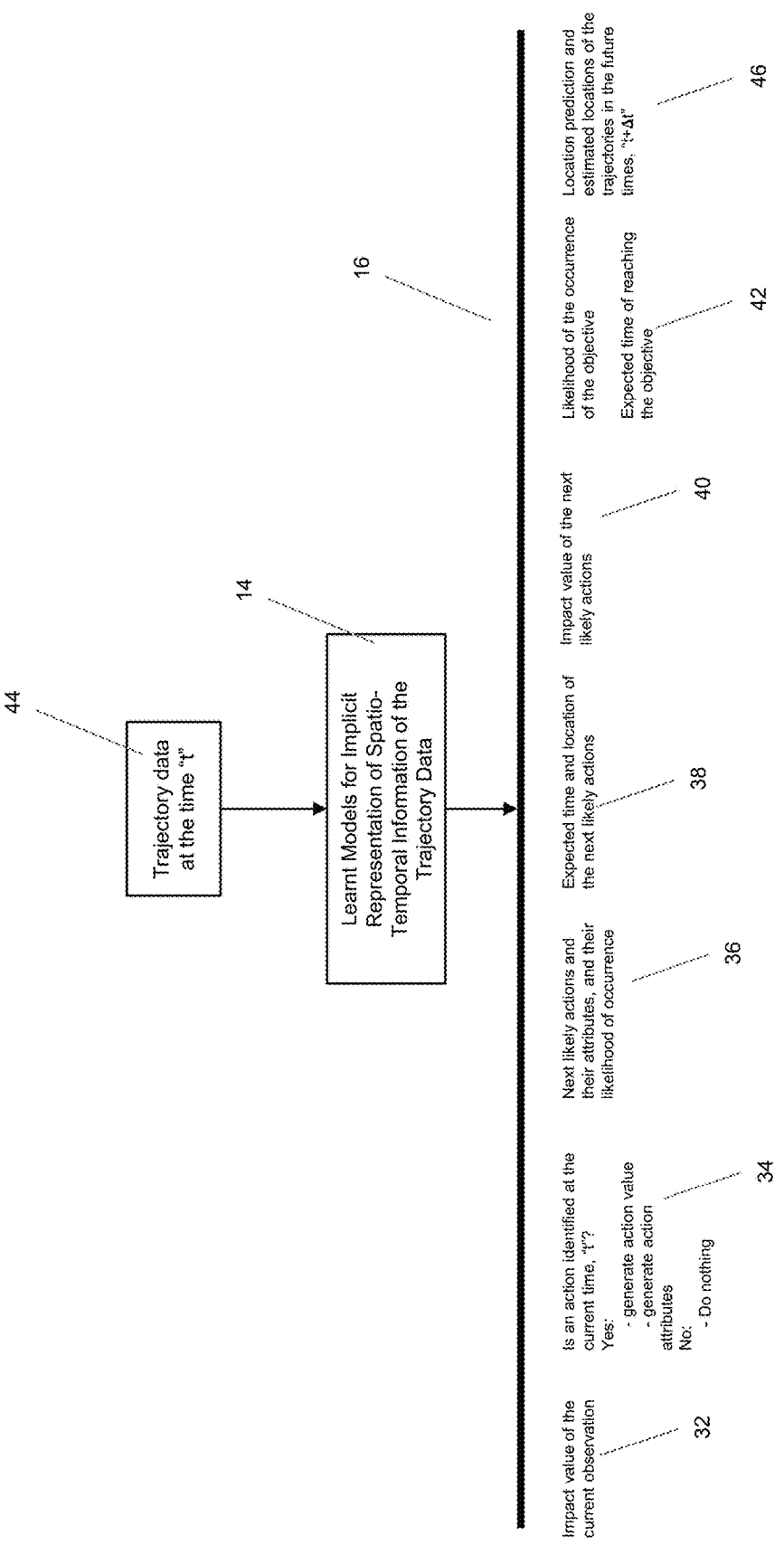
FIG. 3B depicts a block diagram illustrating the data analysis process from trajectory data generating some specific output data points, according to example embodiments.

FIG. 3B Illustrates a schematic block diagram of the data analysis process from a stream of trajectory data 44 for generating some specific output data points 16. The trajectory data can be the location of the humans and objects at the current moment, t, or a set of observations captured in a time window with the length of $\Delta t_0$, captured from $t-\Delta t_0$ to t. The learnt models 14 are mapping functions applied to the trajectory data, and generate at least the outputs described in FIG. 3A. An additional output is generated, the location of the humans and objects and trajectory data for an arbitrarily time in the future, $t+\Delta t$, 46.

Figure 4A:
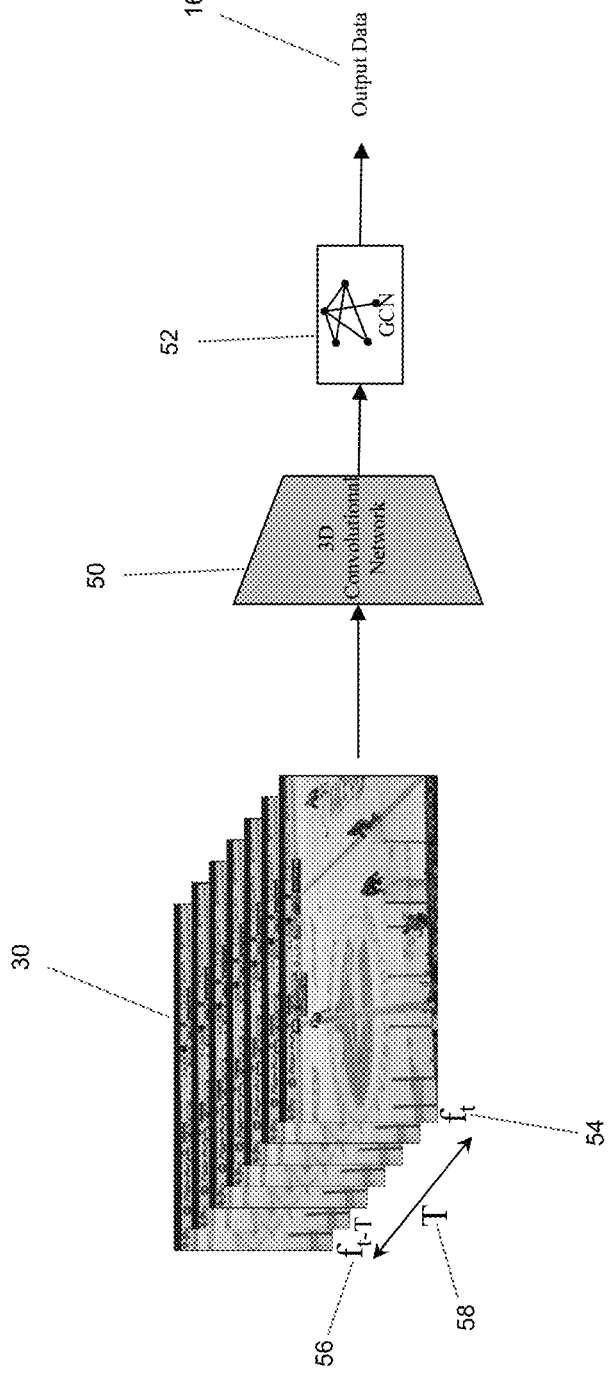
FIG. 4A depicts a schematic diagram illustrating a function approximator that is a combination of 3D convolutional neural networks and graphical neural networks to process the input visual data, according to example embodiments.

FIG. 4A illustrates an exemplary embodiment wherein the input visual data 30, containing video frames spanning a temporal range of T 57, and represented by video frames from $f_{t-T}$ 56 to $f_t$ 54 is passed through the learnt mapping functions 14 to generate the desired output data. An exemplary mapping function 14 is a combination of 3D convolutional neural networks 50 and graph neural networks 52 that are applied directly on the plurality of video pixels to map the input data into the desired outputs.

Figure 4B:
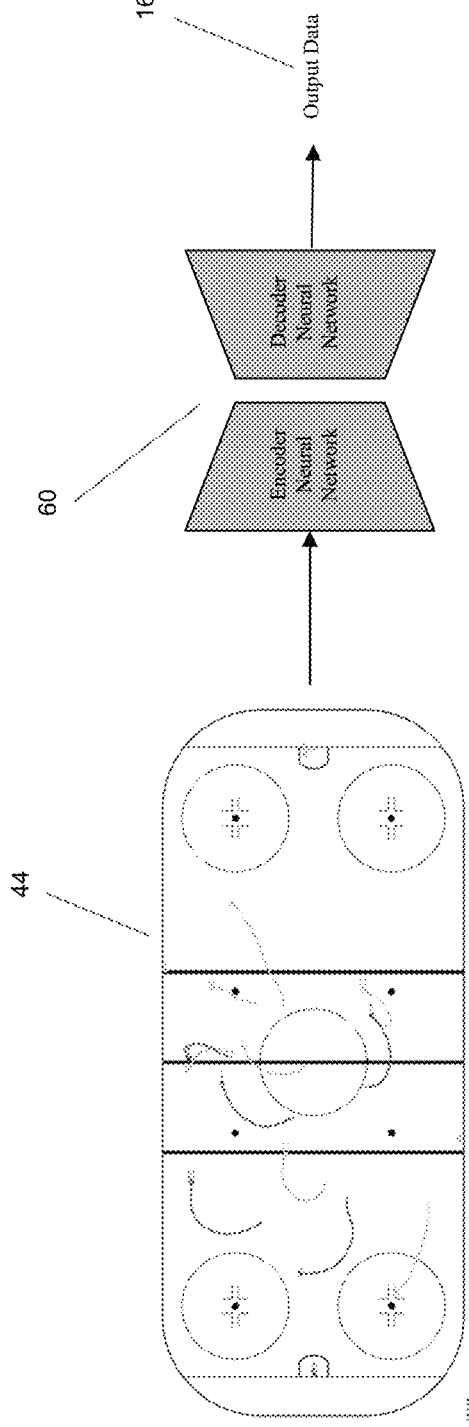
FIG. 4B depicts a schematic diagram illustrating a function approximator neural network to process the input trajectory data depicts, according to example embodiments.

Similarly, FIG. 4B illustrates an exemplary embodiment to process the trajectory data to generate desired outputs. The input data is a sequence of trajectory data 44, spanning a temporal range of T and the learnt models 14 are deep neural networks in the form of encoder-decoder structures 60 or autoencoder structures in an exemplary embodiment to map the input data into the desired output space 16.

Figure 5:
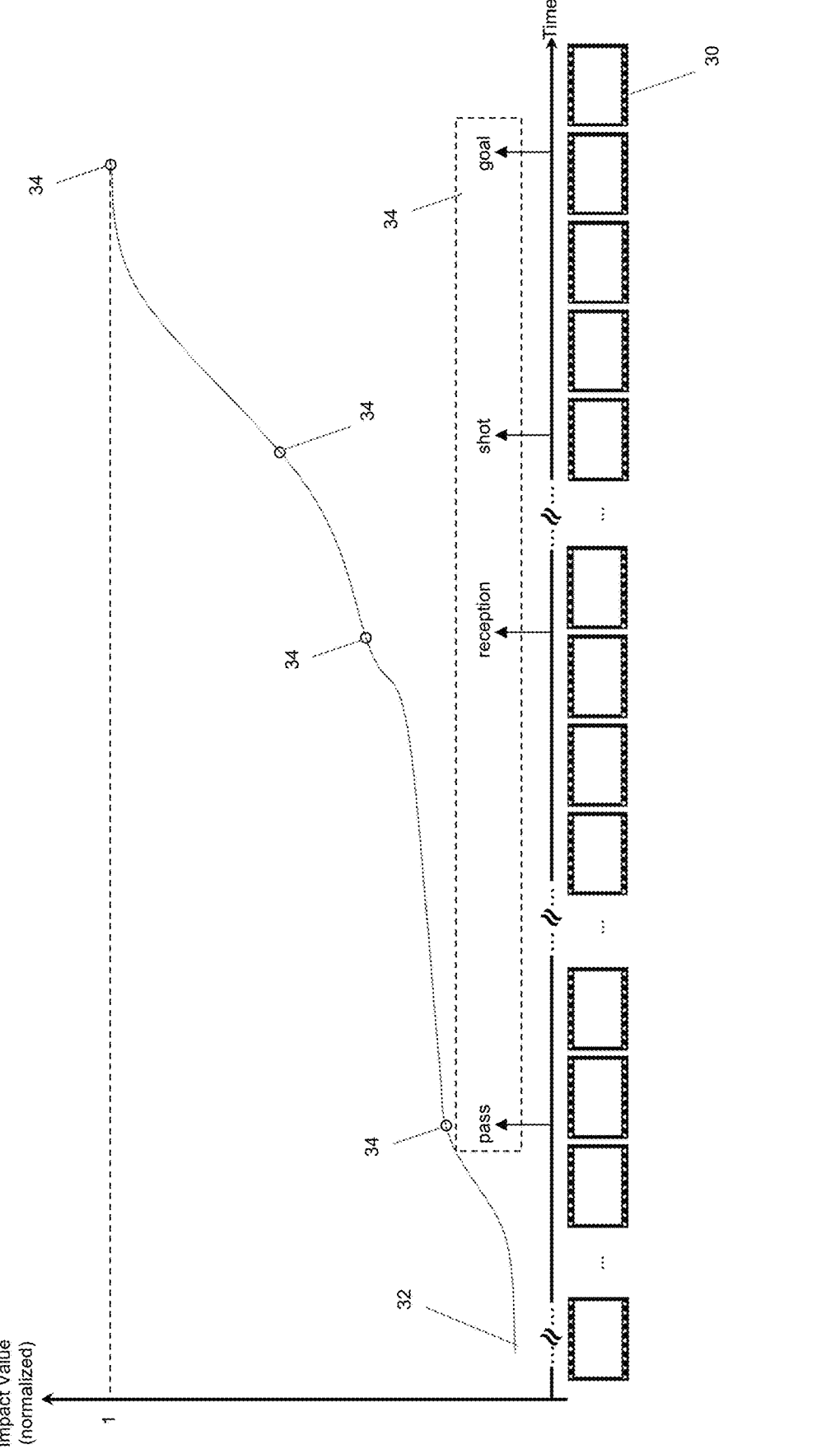
FIG. 5 Illustrates exemplary outputs generated from the visual data, according to example embodiments.

Turning now to FIG. 5, for illustration purposes, an example of the video input data 30, and output impact values 32 are shown. The input is a stream of video frames, sampled at predefined sampling rate such as 30 Hz. The detected and identified actions 34 are shown along with their respective timestamps. It is worth noting that the temporal difference between two consecutive actions can span a wide range, from milliseconds to seconds, and the time between two consecutive events is a random number. The actions and their timestamps 34 can also form a play sequence data, which is temporally sparse compared to the input videos. Scoring a goal is set as the objective, and the impact value at every time that a video frame is observed is calculated indicating the probability of reaching the objective. The action values 34 are drawn from the impact value 32 at the moment that an action happens.

Figure 6:
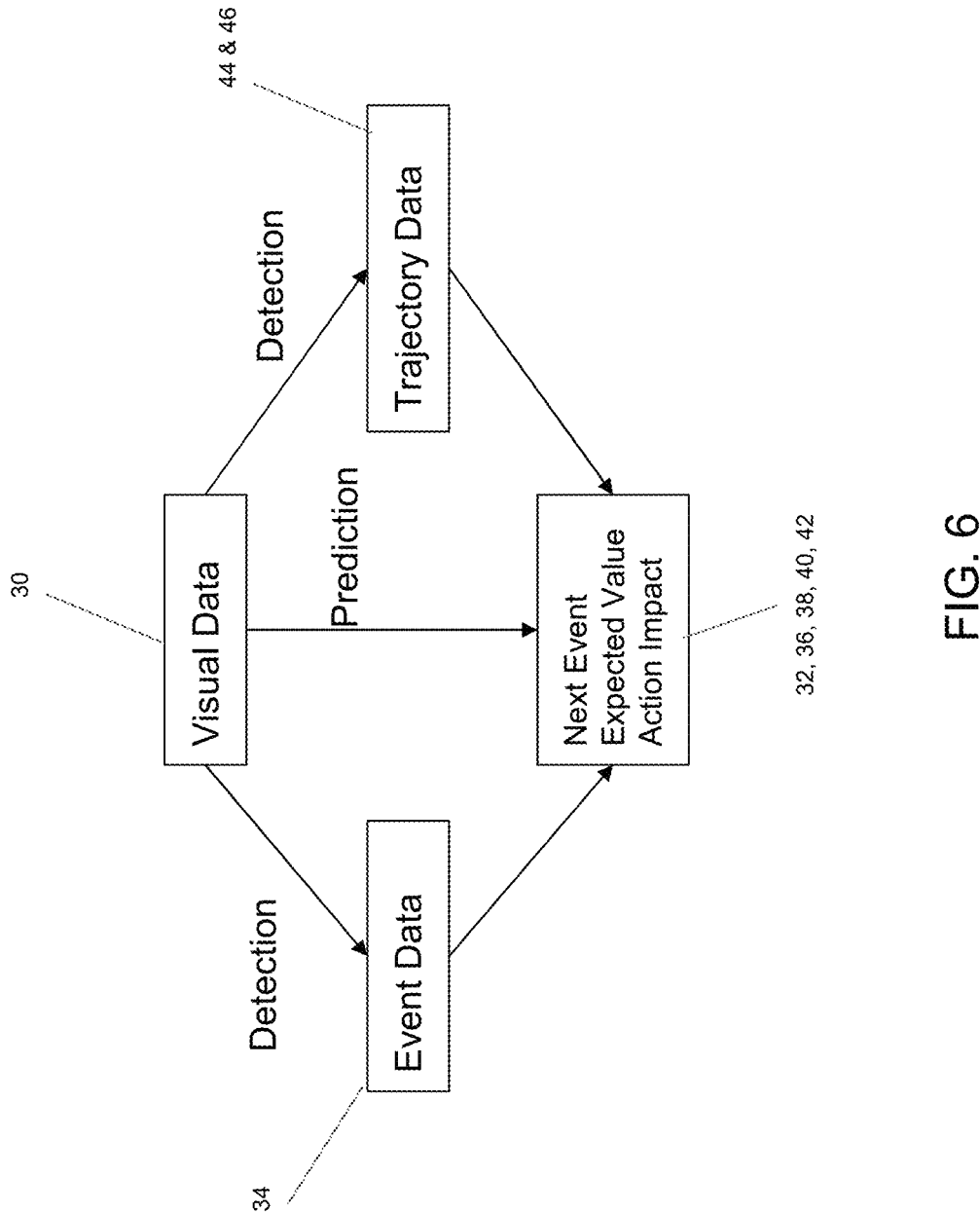
FIG. 6 depicts a schematic representation of the proposed method for simultaneous prediction and detection from visual data.

FIG. 6 depicts an exemplary schematic block diagram of the visual data processing system that performs the detection tasks to detect and identify the relevant contents of the video to identify events and their attributes 34 and the current trajectory data 44 and future trajectory data 46, and simultaneously performs the prediction task to generate the relevant output data next events, the expected values of the current and next events and the impact values of them.

Further detail of the operation of the configurations shown in FIGS. 2, 4A and 4B will now be provided. In the first example, the following describes how to learn a mapping function to map the input pixel data, from a video input to the specific outputs.

The input data is sequence of observations over time, in case of visual inputs and more specifically a video, the input data at a given time t, $I_t$ 30, is a sequence of video frames, spanning a time interval of T 56:

$$I_t = \{f_{t-T}, \cdots f_t\}$$

Wherein the number of video frames representing different timestamps can be equal to or greater than one in the sequence $I_t$ and t denotes the current time.

Given an input data, a numerical mapping function, F, is applied on the input data, $F(I_t)$, which maps the input data into the output space, provides one with at least one of the followings outputs:

$$F(I_t) = \{IV_t, A_t, \text{Traj}_t, NA_t, Pr(\text{Obj})\}$$

Wherein $IV_t$, $A_t$ and $\text{Traj}_t$ are descriptive outputs describing the content of the current observations, $IV_t$ is the impact value of the current observation 32, $A_t$ is the activities currently happening in the observed input with their attributes, if any 34, and $\text{Traj}_t$ is a sequence of observations over time, indicating the locations of players and the objects at a given time t 44. $NA_t$, $Pr(\text{Obj})$, and $\text{Traj}_{t+\Delta t}$ are the predictive outputs. $NA_t$ is related to predicting the next actions which can have one of the following components, the most likely action to happen immediately after the current observation along with its attribute and its probability of occurrence 36, the time interval for the action to happen 38, and the impact value of the next actions 40. $Pr(\text{Obj})$ is a probability distribution function estimating at least one of the following components, the probability of the objective to happen given the current observations, and the expected time that will take from the observation time, t, to the moment that the objectives are reached in the future 42. $\text{Traj}_{t+\Delta t}$ is the predicted location of the players and objects and the corresponding trajectory data for an arbitrarily time in the future, $t+\Delta t$ 46.

In another embodiment, the input data is a sequence of observations over time, indicating the locations of players and the objects at a given time t, $\text{Traj}_t$, with a length of N observations where N that can be equal to or greater than one and spanning a time internal of T, wherein T denotes the temporal lengths of the sequence of location data and t denotes the current time:

$$\text{Traj}_t = \{\text{loc}_{t-T}, \ldots, \text{loc}_t\}$$

Wherein $\text{Loc}_t$ is the set of players and objects location data observed at time $$t: \text{loc}_t = \{(x_i(t), y_i(t), z_i(t))\}_{i=1, \ldots, M}$$

in which, $(x_i(t), y_i(t), z_i(t))$ is the location of the ith object or player in either 2D or 3D space, and M denotes the numbers of players and objects observed at t. During pre-processing, all the trajectories are normalized to the length and width of the corresponding playing area. To deal with missing trajectories, different padding techniques can be used such as zero-padding.

Given the input data, a numerical mapping function, F, is applied on the input data, $F(\text{Traj}_t)$, which maps the input data into the output space, containing at least one of the following:

$$F(I_t) = \{IV_t, A_t, NA_t, Pr(\text{Obj}), \text{Traj}_{t+\Delta t}\}$$

wherein the additional output, $\text{Traj}_{t+\Delta t}$ is the predicted location of the players and objects and the corresponding trajectory data for an arbitrarily time in the future, $t+\Delta t$ 46.

Learning the Mapping Functions and Assigning Impact Values

The numerical mapping function, T, is learnt from some labeled data referred to as the training data set. T can be a multi-task trained function that generates all the desired outputs, or can be a set of distinct mapping functions where each one is trained to generate a subset of the outputs.

In one exemplary embodiment, the numerical mapping function F is one or a set of convolutional neural networks (CNNs) in a two dimensional pixels, applied to the images in the visual input data to generate the desired outputs, or generating intermediate representative features of the visual data followed by an aggregation mechanism ed along the temporal dimension using temporal data modelling techniques such as Long Short-Term Memory neural networks (LSTMs).

In another exemplary embodiment, three dimensional CNNs such as C3D or I3D models can be applied on the video data as the numerical mapping function, and generate the desired output trained using an appropriate training mechanism. The 3D convolutional filters are applied directly on the visual input data to model the spatio-temporal content of the input and learn to map the input data into the desired outputs without explicitly modelling the actions and events.

Rather than explicitly defining the actions, detecting and identifying them and generating play sequence data in order to estimate the impact values as it is done in the conventional sport analytics methods to analyze sports and games and measure the impact values of the actions using explicitly determined play sequence data, the disclosed method uses an implicit spatio-temporal model, F, which automatically learns the spatial and temporal content of the input data for descriptive and predictive analysis. The learning is done by applying machine learning and artificial intelligence techniques on the input data, to extract spatio-temporal information characterizing content of the visual data for describing and predicting the actions.

Training Process—Objective for Function Approximation

Assuming that F is an artificial neural network, using function approximation techniques such as artificial neural networks, the parameters of all the components of F could be either estimated separately or jointly using standard machine learning techniques such as gradient based learning methods that are commonly used for artificial neural networks. In one ideal setting, the whole parameter estimation of those components can be estimated using a standard loss function, learnt from a set of available labelled examples. In the case of separately learning the parameters of those components, each one can be estimated separately and then the learnt models can be combined together. To estimate all parameters together, neural network models can be trained in an end-to-end fashion to simultaneously describe and predict the content of the input data. For both tasks one can use a standard loss function such as cross-entropy loss and combine the regression and classification losses in a weighted sum:

$$CL_t = \lambda_{iv} L(IV_t, IV_{gt}) + \lambda_a L(A_t, A_{gt}) + \lambda_{na} L(NA_t, NA_{gt}) + \lambda_{traj_{generation}} L(\text{Traj}_t, \text{Traj}_{gt,t}) + \lambda_{Obj} L(Pr(\text{Obj}), Pr_{gt}(\text{Obj})) + \lambda_{traj_{prediction}} L(\text{Traj}_{t+\Delta t}, \text{Traj}_{gt,t+\Delta t})$$

where $CL_t$ is the combined loss for an observation t, $L(,)$ are losses to measure the difference between the estimated values and the groundtruth in training data, $\lambda$s are scalar weights of each loss for a specific task, and $\bullet_{gt}$ are ground truth labels or ground truth values for the respective input in the training set data. The cross entropy loss can be used both for classification and regression parts, and other loss functions such as elbow loss or Wasserstein distance and its variations or KL divergence can be used for the probability distribution functions, such as $Pr(\text{Obj})$. The last term in the loss, which learns to predict the location of the players and object, $L(\text{Traj}_{t+\Delta t}, \text{Traj}_{gt,t+\Delta t})$ is applicable when the input contains trajectory data. In the case of using pixel data as the input, this term can be removed. The numerical mapping function, F, can be learnt by optimizing the combined loss for any combination of the desired outputs in the training process.

After the training is done by minimizing the combined loss using a plurality training data, the numerical mapping function, F, can be applied on an input, such as visual data or trajectory data to generate the desired output data.

In another embodiment, the numerical mapping function, F, can be decomposed into several mapping functions, each of them can map the input to at least one of the desired outputs. Assuming that F is decomposed into two mapping functions, $F_1$ and $F_2$:

$$F(I_t) = F_2(F(I_t))$$

Wherein $F_1(I_t) = \{A_t\}$, i.e., a mapping function that maps the input data into detected events and generates events and their attributes that are observed at the current moment. $F_2$ is applied on the output of $F_1(I_t)$, which are the detected actions and events, to generate the desired outputs such as impact values and the probability distribution function characterizing the predefined objective.

$$F(I_t) = F_2(F_1(I_t) = F_2(A_t) = \{IV_t, NA_t, Pr(\text{Obj})\}$$

Similarly, the same decomposition can be done when the input data are trajectories. An exemplary decomposition of the numerical mapping function into two components is illustrated in FIG. 4A, wherein a 3D convolutional neural network, such as I3D models 50 is applied on the input video and is combined with a graph neural network 52 to generate the desired output data.

To generate ground truth data for the impact values and action values, different approaches can be used. One can take the objective, Obj, and assign a positive value to it such as +1 and then discount the value over time to assign a quantitative value to each preceding action.

For example, the training can be done without using explicit game models and the Obj or an event of interest can be directly used as the objective function to calculate the loss for the mapping function approximation. The objective can be discounted to generate a non-zero value for the previous events.

Alternatively, a more refined approach is to take an already available game model, which can assign a quantitative value to each action in a play sequence data, and use those quantitative values as the target or ground truth action values. Using a decision evaluation model such as a Markov Model or a Reinforcement Learning model, a quantitative value or score is assigned to every single action or a sequence of actions, generated using the play sequence data in the training data set. In the context of sport games, the values of the events can be related to the predefined objective, such as scoring a goal for a team or reducing the chance of getting a penalty for a team. As an example, if the objective is to score goals in a sport game, then the impact of every single event in the game on scoring the next goal for a team can be calculated using a game model. Some events may have a positive impact, negative impact or a neutral impact on scoring a goal.

In one exemplary embodiment, Markov Models are used to formalize the ice hockey game and compute the values of each action in a play sequence data. After a game's individual events have been evaluated using a Markov Model or any other evaluation model such as mentioned previously, the training dataset can be formed in order to calculate the training losses and train the numerical mapping function. In this way, the system described herein develops and relies on models that learn how a game is actually played, and optimal strategies can be considered as implicit natural outcomes of the learnt models.

Typically, in sports analytics the existing game models take the play sequence data as the input and assign a quantitative value to each action. Since each action is recorded with a single timestamp, resulting in a description of a game that includes a sequence of discrete instances in time. For example, the actions may be several seconds apart from each other in the play sequence data, while the objective is to assign a value to the input data at every moment, t, which can have a vastly different sampling rate. The impact value is a continuous function of the action impacts and time. The exact nature of this function may vary depending on the sport or the event, for example a multimodal gaussian distribution can be learnt from data to represent the temporal continuity of the impact values.

Alternatively, instead of using classification and regression losses, in the training phase, the training regimes in the reinforcement learning techniques can be used. In deep reinforcement learning (DRL), given an objective, action values in a sequence of discrete actions are learnt from labeled data, which is known as the Q-function. More specifically, given a dataset of play sequence data and an objective, the value of each action is estimated using standard reinforcement learning (RL) applied to a discrete space of the player actions.

Once the objective is defined, according to the defined loss functions the learning process 22 can be carried out using standard machine learning techniques, to minimize the defined loss function 28 in order to generate the leant models that map the input pixels data or trajectory data into the output space. Once the training process is done, the mapping function is learnt and is represented by the Learnt Models for Implicit Representation of Spatio-Temporal Information of the Pixel Data 14. The learnt model can be one single mapping function that performs all the detection and prediction tasks simultaneously, or an ensemble of multiple mapping functions in which each mapping function is trained to generate one or a subset of desired outputs.

Based on the learnt impact values at every moment in the game, different metrics can be generated to evaluate players and team performance. For example, one can take the impact values of all the actions that a specific player is taking, aggregate over a period of time during the game and hence, measure the impact of that player's action on reaching the objective.

Similarly, the objective can be adjusted to represent a player instead of the team to develop more relevant metrics for the players. For example, the objective can be defined as a specific player scoring a goal. This will result in generating metrics to assess that particular player. Aggregation of those metrics can also result in making predictions for different objectives related to a sport game.

The generated impact values can also be used to generate game highlights for media applications, as they quantitatively measure the importance of different moments of the games. Considering that scoring a goal is the pred-defined objectives, using impact values to generate a highlight reel will result in capturing all the moments in a game in which there was a high chance of scoring a goal for a team.

Pr(Obj) be interpreted as a simple in-game win probability, wherein the probability for each team scoring a goal can be calculated, one for if one team is to score immediately, and another for if the opposing team is to score immediately. The difference between each of these and the actual current win probability represent the effect that scoring a goal would have for each team. This value increases when the game is close in score, especially near the end of the game.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems described herein, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

1. System and method for visual event description and event analysis, U.S. Ser. No. 15/388,666
2. Gavrilyuk, Kirill, Ryan Sanford, Mehrsan Javan, and Cees GM Snoek. "Actor-transformers for group activity recognition." In Proceedings of the IEEE/CVF Conference on Computer Vision and Pattern Recognition, pp. 839-848. 2020.
3. Karpathy, Andrej, George Toderici, Sanketh Shetty, Thomas Leung, Rahul Sukthankar, and Li Fei-Fei. "Large-scale video classification with convolutional neural networks." In Proceedings of the IEEE conference on Computer Vision and Pattern Recognition, pp. 1725-1732. 2014.
4. System and Method for Evaluating Team Game Activities, PCT/CA2017/050253
5. Liu, Guiliang, Oliver Schulte, Pascal Poupart, Mike Rudd, and Mehrsan Javan. "Learning Agent Representations for Ice Hockey." Advances in Neural Information Processing Systems 33 (2020).
6. Li, Zhenyang, Kirill Gavrilyuk, Efstratios Gavves, Mihir Jain, and Cees GM Snoek. "Videolstm convolves, attends and flows for action recognition." Computer Vision and Image Understanding 166 (2018): 41-50.
7. Carreira, Joao, and Andrew Zisserman. "Quo vadis, action recognition? a new model and the kinetics dataset." In proceedings of the IEEE Conference on Computer Vision and Pattern Recognition, pp. 6299-6308. 2017.
8. Learning sports highlights using event detection, U.S. Ser. No. 13/314,837
9. Automatic soccer video analysis and summarization, PCT/US2003/023776

The invention claimed is:

1. A method for processing data to describe content of the data and to generate predictions associated with events occurring in the content, the method comprising:
   receiving input data comprising at least one image from a video of a scene showing one or more entities at a corresponding time;
   applying at least one descriptive and predictive model on the received data by way of a mapping function transforming the received input data into output data, the at least one descriptive and predictive model comprising the mapping function previously learnt from historical data; and
   providing output data comprising an estimation of a likelihood of at least one event of interest occurring in the video or the scene, wherein the estimation is derived from visual content of the at least one image in the received input data.

2. The method of claim 1, further comprising:
   using a training set comprising at least one predefined objective or a labeled event of interest and its corresponding time; and,
   applying at least one machine learning or artificial intelligence technique to learn the mapping function from the training set, wherein the mapping function assigns a plurality of quantitative values to the input data to represent the content of the input data.

3. The method of claim 1, further comprising outputting at least one of: detected actions and events and their corresponding attributes at a current point in time, an impact of a current observation on reaching a predefined objective, a probability of occurrence of any action and/or event at a future time, an impact of the future action and/or event on reaching the predefined objective, and a probability of reaching the predefined objective in the future.

4. The method of claim 1, further comprising generating a probability distribution function characterizing future activities and events, given current observations.

5. The method of claim 1, further comprising generating a probability distribution function characterizing a predefined objective, given current observations.

6. The method of claim 1, further comprising generating the location data of the entities from current visual observations.

7. The method of claim 1, further comprising predicting future locations of the entities.

8. The method of the claim 1, further comprising generating the output data in real-time for sports betting and/or media applications.

9. The method of claim 1, further comprising generating at least one quantitative metric to rank players or teams and assess player performance or team performance in games, measure an effect of a player or team activity in the game, a player contribution to a future game, or a player or team efficiency in achieving a particular outcome.

10. The method of claim 1, further comprising generating at least one quantitative metric to predict player performance and game outcomes.

11. The method of claim 1, further comprising outputting at least one label to categorize an individual or a group activity in the visual data.

12. The method of claim 1, further comprising generating at least one quantitative metric to predict an outcome of a sport match.

13. The method of claim 1, further comprising using artificial neural networks to represent the mapping function.

14. The method of claim 1 further comprising using reinforcement learning techniques to learn the mapping functions.

15. A non-transitory computer readable medium storing computer executable instructions for processing data to describe content of the data and to generate predictions associated with events occurring in the content, comprising instructions for:
   receiving input data comprising at least one image from a video of a scene showing one or more entities at a corresponding time;

applying at least one descriptive and predictive model on the received data by way of a mapping function transforming the received input data into output data, the at least one descriptive and predictive model comprising the mapping function previously learnt from historical data; and providing output data comprising an estimation of a likelihood of at least one event of interest occurring in the video or the scene, wherein the estimation is derived from visual content of the at least one image in the received input data.

16. The computer readable medium of claim 15, further comprising instructions for:

using a training set comprising at least one predefined objective or a labeled event of interest and its corresponding time; and, applying at least one machine learning or artificial intelligence technique to learn the mapping function from the training set, wherein the mapping function assigns a plurality of quantitative values to the input data to represent the content of the input data.

17. The computer readable medium of claim 15, further comprising instructions for outputting at least one of: detected actions and events and their corresponding attributes at a current point in time, an impact of a current observation on reaching a predefined objective, a probability of occurrence of any action and/or event at a future time, an impact of the future action and/or event on reaching the predefined objective, and a probability of reaching the predefined objective in the future.

18. The computer readable medium of claim 15, further comprising instructions for generating a probability distribution function characterizing future activities and events, given current observations.

19. The computer readable medium of claim 15, further comprising instructions for generating a probability distribution function characterizing a predefined objective, given current observations.

20. A device comprising a process and memory, the memory storing non-transitory computer readable instructions for processing data to describe content of the data and to generate predictions associated with events occurring in the content, comprising instructions for:

receiving input data comprising at least one image from a video of a scene showing one or more entities at a corresponding time;

applying at least one descriptive and predictive model on the received data by way of a mapping function transforming the received input data into output data, the at least one descriptive and predictive model comprising the mapping function previously learnt from historical data; and providing output data comprising an estimation of a likelihood of at least one event of interest occurring in the video or the scene, wherein the estimation is derived from visual content of the at least one image in the received input data.

* * * * *